(No Model.)

H. J. LAWSON.
VELOCIPEDE.

No. 345,851. Patented July 20, 1886.

Witnesses:
Geo. H. Fraser
Geo. Bainton

Inventor:
Henry John Lawson
By his Attorneys,
Burke, Fraser & Connett

UNITED STATES PATENT OFFICE.

HENRY JOHN LAWSON, OF COVENTRY, COUNTY OF WARWICK, ENGLAND.

VELOCIPEDE.

SPECIFICATION forming part of Letters Patent No. 345,851, dated July 20, 1886.

Application filed March 16, 1886. Serial No. 195,395. (No model.) Patented in England September 30, 1879, No. 3,934.

*To all whom it may concern:*

Be it known that I, HENRY JOHN LAWSON, a subject of the Queen of Great Britain, and a resident of Coventry, in the county of Warwick, England, have invented certain Improvements in Bicycles, (for which I have been granted a patent in Great Britain, dated September 30, 1879, No. 3,934,) of which the following is a specification.
My invention relates to that class of bicycles in which the front wheel is employed for steering and the rear wheel for driving, the pedal crank-axle being arranged between the wheels and connected with the axle of the rear wheel for driving by an endless driving-chain.

The object in this construction is to secure the rider against being thrown forward over the front wheel by keeping his center of gravity low and setting his seat or saddle as far back as is practicable from the center of the front wheel. This mode of driving through the medium of sprocket-wheels and chains also allows the driving-wheel to be geared up or down to suit individual tastes.
My invention will be fully described hereinafter, and its novel features carefully defined in the claims.

Figure 1:
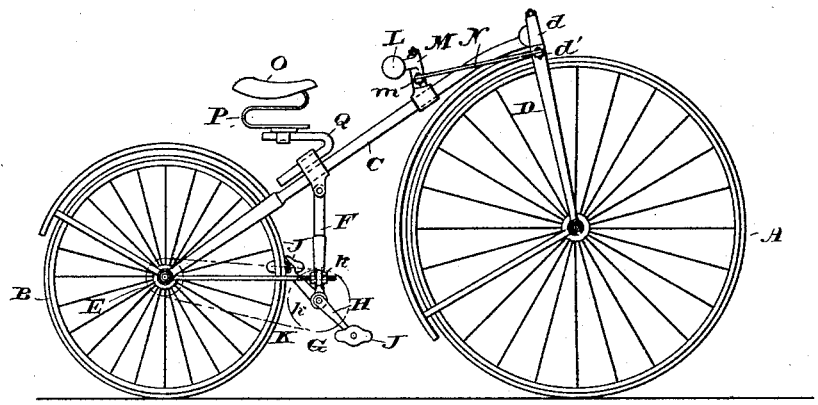
Figure 2:
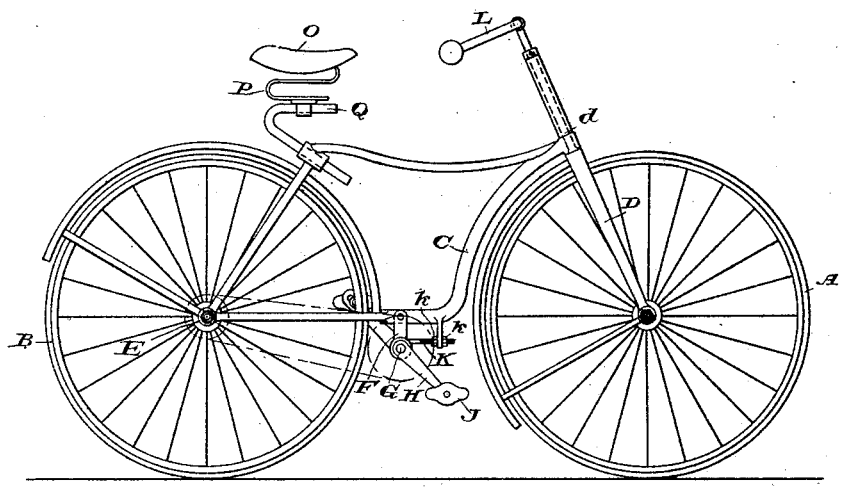

In the drawings illustrating my invention, Figure 1 is a side elevation of a bicycle embodying my invention, wherein the front or steering-wheel is considerably larger than the driving-wheel; and Fig. 2 is a similar view of a bicycle provided with my improvements, wherein the wheels are of the same size. In the latter construction the saddle is arranged over the driving-wheel.

Referring to Fig. 1, the steering-wheel A and driving-wheel B are connected together by a frame, C, one end of which is connected to the backwardly-inclined fork D, carrying the wheel A, by a jointer-head, d, and the other end of said frame is forked to support the axle E of the driving-wheel B. From this frame C, in a position between the wheels, depends a forked bracket, F, which carries a pedal crank-axle, G, on which is mounted a sprocket-wheel, from which motion is communicated to another chain-wheel on the axle E of driving-wheel B by an endless chain. The crank-axle is provided with suitable cranks, H, and pedals J.

The tightening of the chains is effected by means of rods or stays K, which extend from the pendent bracket F to any convenient part of the frame, and are provided with suitable adjusting-nuts, k.

In my English patent, before referred to, I relied upon the flexibility of the pendent bracket F to permit it to yield sufficiently to enable any looseness of the chains to be taken up, and this will suffice where the bracket is of considerable length; but I prefer to hinge it, as shown in Fig. 1, to the sleeve by which it is connected to the frame C.

The bicycle is steered by the front wheel, A, through the medium of a transverse handle-bar, L, mounted on a socket, M, pivoted on the frame of the machine, and connected to the raked fork D, carrying the steering-wheel, by bridle-rods N, coupled to short levers m and d' on the socket and fork, respectively. The seat or saddle O is mounted on a suitable spring, P, carried by a bent support, Q, which is adjustably mounted in an inclined sleeve or socket on the inclined frame C, by means of which the saddle may be raised or lowered within limits.

Referring to Fig. 2, A designates the steering-wheel, and B the driving-wheel, both of the same size. C is the frame of the machine, here shown with an elevated bar, on which the saddle O is mounted, and a depressed portion carrying the bracket F and pedal crank-axle G. The bracket F in this construction is necessarily quite short. K are the stays which connect the bracket with a pendent lug on the frame C. In this construction the bent support Q has its lower branch secured in a socket in the elevated portion of frame C, and the transverse handle-bar L is fixed directly to an extension of the fork D, its handles being bent backward toward the saddle or seat O.

Having thus described my invention, I wish to say that I am aware that prior to the date of my English patent, before referred to, it had been proposed to provide a bicycle having a small front steering-wheel and a larger rear driving-wheel with a pedal crank-axle between said wheels and chain gearing for driving. I am aware, also, that means for tightening the driving-chain differing from mine had been employed in bicycles prior to said date. These I do not claim; but

What I do claim is—

1. A bicycle having two wheels arranged tandem as shown, the rear wheel being no larger than the front wheel, and provided with a pedal crank-axle arranged between said wheels and connected to the rear wheel, for driving by an endless chain and sprocket-wheel, substantially as specified.

2. A bicycle having its two wheels arranged tandem, with the larger wheel in front mounted as a steering-wheel, having a bracket between the wheels pendent from the frame, and the pedal crank-axle mounted in said bracket, having chain gearing, as described, for communicating the motion of the crank-axle to the rear wheel for driving, and having a stay, K, provided with adjusting-nuts $k$, extending from the pendent end of the bracket to some part of the frame, whereby the driving-chains are tightened by moving the pendent end of the bracket.

In witness whereof I have hereunto signed my name in the presence of two subscribing witnesses.

HENRY JOHN LAWSON.

Witnesses:
 ROBT. ED. PHILLIPS,
 EDWARD C. HAMMOND,
  *Both of* 70 *Chancery Lane, London, W. C.*